US011837009B2

United States Patent
Azumi

(10) Patent No.: US 11,837,009 B2
(45) Date of Patent: Dec. 5, 2023

(54) APPARATUS AND METHOD FOR ULTRASONIC FINGERPRINT AND TOUCH SENSING

(71) Applicant: QUALCOMM Incorporated, San Diego, CA (US)

(72) Inventor: Kohei Azumi, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/247,781

(22) Filed: Dec. 22, 2020

(65) Prior Publication Data
US 2022/0198173 A1 Jun. 23, 2022

(51) Int. Cl.
G06V 40/13 (2022.01)
G06F 3/041 (2006.01)
G06F 3/043 (2006.01)

(52) U.S. Cl.
CPC .......... G06V 40/1306 (2022.01); G06F 3/043 (2013.01); G06F 3/0412 (2013.01); G06F 3/04166 (2019.05)

(58) Field of Classification Search
CPC ............ G01V 40/1306; G06F 3/04166; G06F 3/0412; G06F 3/043; G06F 3/0433
See application file for complete search history.

(56) References Cited

U.S. PATENT DOCUMENTS

| | | | |
|---|---|---|---|
| 6,720,712 B2 * | 4/2004 | Scott | G06V 40/1306 310/319 |
| 9,041,684 B2 | 5/2015 | Santos et al. | |
| 9,195,879 B1 * | 11/2015 | Du | G06V 40/50 |
| 9,349,035 B1 * | 5/2016 | Gerber | G06V 40/13 |
| 9,460,334 B2 * | 10/2016 | Lan | G06F 18/00 |
| 9,665,763 B2 * | 5/2017 | Du | G06V 40/1306 |
| 10,032,061 B2 | 7/2018 | Chia et al. | |
| 10,042,467 B2 | 8/2018 | Schwartz et al. | |
| 11,232,178 B2 * | 1/2022 | Schwartz | G06V 40/1306 |
| 2009/0067684 A1 * | 3/2009 | Mainguet | G06V 40/1306 382/124 |
| 2014/0270413 A1 | 9/2014 | Slaby et al. | |
| 2014/0333328 A1 | 11/2014 | Nelson et al. | |
| 2015/0331508 A1 | 11/2015 | Nho et al. | |

(Continued)

OTHER PUBLICATIONS

International Search Report and Written Opinion—PCT/US2021/072975—ISA/EPO—dated May 11, 2022.

*Primary Examiner* — Albert K Wong
(74) *Attorney, Agent, or Firm* — QUALCOMM Incorporated

(57) ABSTRACT

An ultrasonic fingerprint sensor may include sensor pixels with interleaved ultrasonically-sensitive regions. Each of a plurality of sensor pixels in the ultrasonic fingerprint sensor may include nine distinct ultrasonically-sensitive regions electrically coupled to a common readout circuit, where there is an ultrasonically-sensitive region of another sensor pixel disposed between each of the nine distinct ultrasonically-sensitive regions. The ultrasonic fingerprint sensor may further include circuitry for binning together groups of sensor pixels during certain lower-resolution operations such as touch sensor operations. The ultrasonic fingerprint sensor may be used in capturing fingerprint images that are then used in an authentication process.

18 Claims, 9 Drawing Sheets

(56) References Cited

U.S. PATENT DOCUMENTS

2016/0350571 A1* 12/2016 Han .................... G06F 3/04164
2018/0276440 A1    9/2018 Strohmann et al.
2019/0311174 A1* 10/2019 Schmitt ................. G06V 20/64
2019/0318147 A1  10/2019 Shen et al.

* cited by examiner

APPARATUS AND METHOD FOR ULTRASONIC FINGERPRINT AND TOUCH SENSING

TECHNICAL FIELD

This disclosure relates generally to ultrasonic fingerprint sensors and methods for using such systems.

DESCRIPTION OF THE RELATED TECHNOLOGY

Ultrasonic fingerprint sensors have been included in devices such as smartphones, cash machines and cars to authenticate a user. Although some existing ultrasonic fingerprint sensors can provide satisfactory performance, improved ultrasonic fingerprint sensors would be desirable.

SUMMARY

The systems, methods and devices of the disclosure each have several innovative aspects, no single one of which is solely responsible for the desirable attributes disclosed herein.

One innovative aspect of the subject matter described in this disclosure can be implemented in a device or apparatus including an ultrasonic fingerprint sensor system. The ultrasonic fingerprint sensor system may include a two-dimensional array of ultrasonic receiving pixels, where each of a plurality of the ultrasonic receiving pixels is divided into and associated with a plurality of ultrasonically-sensitive subregions that are electrically coupled to a common node and where each of the plurality of the ultrasonically-sensitive subregions is substantially surrounded by ultrasonically-sensitive subregions associated with other ultrasonic receiving pixels such that the ultrasonically-sensitive subregions of different ultrasonic receiving pixels are interleaved together within the array.

In some implementations, each of the plurality of the ultrasonic receiving pixel is divided into and associated with nine (9) ultrasonically-sensitive subregions that are electrically coupled to the common node. According to some examples, the two-dimensional array is part of a larger two-dimensional array of ultrasonic receiving pixels. In some instances, the apparatus is integrated into a mobile device having a display and the larger two-dimensional array of ultrasonic receiving pixels extends substantially entirely across the display. In some instances, the device or apparatus further includes a control system and the ultrasonic fingerprint sensor system further includes one or more ultrasonic transmitters, where the control system is configured to (a) drive the ultrasonic transmitters as part of a fingerprint sensing operation, configured to (b) obtain receiver signals from the common nodes of at least some of the ultrasonic receiving pixels, and configured to (c) convert the obtained receiver signals into fingerprint characteristics. In some instances, the ultrasonic fingerprint sensor system further includes a plurality of binning switches, where each of the binning switches is electrically coupled between the common nodes of a respective pair of adjacent ultrasonic receiving pixels, and the control system is further configured to (d) drive the ultrasonic transmitters as part of a touch position sensing operation, configured to (e) close a plurality of the binning switches to bin together at least some of the common nodes, configured to (f) obtain receiver signals from the binned common nodes, and configured to (g) convert the obtained receiver signals from the binned common nodes into at least one pair of touch position coordinates. In some instances, the apparatus further includes a control system and the ultrasonic fingerprint sensor system further includes one or more ultrasonic transmitters, where the control system is configured to (a) drive the ultrasonic transmitters as part of a fingerprint sensing operation, configured to (b) obtain receiver signals from the common nodes of at least some of the ultrasonic receiving pixels, and configured to (c) convert the obtained receiver signals into at least one pair of touch position coordinates. In some instances, the apparatus further includes a control system configured for controlling the ultrasonic fingerprint sensor system for transmission of first ultrasonic waves towards a target object in contact with a surface, the surface being an ultrasonic fingerprint sensor surface or a surface of a device proximate an area in which the ultrasonic fingerprint sensor resides, receiving first ultrasonic receiver signals from the ultrasonic fingerprint sensor, the first ultrasonic receiver signals including signals corresponding to reflections of the first ultrasonic waves from the target object, obtaining an estimation of a touch location of the target object on the surface based on the first ultrasonic receiver signals received, controlling the ultrasonic fingerprint sensor system for transmission of second ultrasonic waves towards the target object in contact with the surface, receiving second ultrasonic receiver signals from the ultrasonic fingerprint sensor, the second ultrasonic receiver signals including signals corresponding to reflections of the second ultrasonic waves from the target object, and obtaining a fingerprint image or fingerprint characteristics of the target object on the surface based on the second ultrasonic receiver signals received, where controlling the ultrasonic fingerprint sensor system for transmission of the second ultrasonic waves and/or receiving the second ultrasonic receiver signals includes transmitting the second ultrasonic waves and/or receiving the second ultrasonic receiver signals over a partial fraction of the surface and where the control system is configured to select the partial fraction based on the obtained estimate of the touch location.

Other innovative aspects of the subject matter described in this disclosure can be implemented in a device or apparatus including an ultrasonic sensor system. The ultrasonic sensor system may include a two-dimensional array of ultrasonic receiving pixels, where the array has edges, the array is divided into a first fraction of ultrasonic receiving pixels are disposed along one or more of the edges of the array and a second fraction of ultrasonic receiving pixels separated from the edges by at least one ultrasonic receiving pixel of the first fraction, each of the ultrasonic receiving pixels in the second fraction is divided into a plurality of ultrasonically-sensitive subregions that are electrically coupled to a common node, and each of the ultrasonically-sensitive subregions is substantially surrounded by ultrasonically-sensitive subregions associated with other ultrasonic receiving pixels such that the ultrasonically-sensitive subregions of different ultrasonic receiving pixels in the second fraction are interleaved together within the array.

In some implementations, each of the ultrasonic receiving pixels in the second fraction is divided into and associated with nine (9) ultrasonically-sensitive subregions that are electrically coupled to the common node. According to some examples, the apparatus further includes a control system, the ultrasonic sensor system further includes one or more ultrasonic transmitters, and the control system is configured to (a) drive the ultrasonic transmitters as part of a fingerprint sensing operation, configured to (b) obtain receiver signals from the common nodes of at least some of the ultrasonic receiving pixels, and configured to (c) convert the obtained receiver signals into fingerprint characteristics. In some instances, the ultrasonic sensor system further include a plurality of binning switches, where each of the binning switches is electrically coupled between the common nodes of a respective pair of adjacent ultrasonic receiving pixels, and where the control system is further configured to (d) drive the ultrasonic transmitters as part of a touch position sensing operation, configured to (e) close a plurality of the binning switches to bin together at least some of the common nodes, configured to (f) obtain receiver signals from the binned common nodes, and configured to (g) convert the obtained receiver signals from the binned common nodes into at least one pair of touch position coordinates. In some instances, the apparatus further includes a control system, the ultrasonic sensor system further includes one or more ultrasonic transmitters, and the control system is configured to (a) drive the ultrasonic transmitters as part of a fingerprint sensing operation, configured to (b) obtain receiver signals from the common nodes of at least some of the ultrasonic receiving pixels, and configured to (c) convert the obtained receiver signals into at least one pair of touch position coordinates. In some instances, the apparatus further includes a control system configured for controlling the ultrasonic sensor system for transmission of first ultrasonic waves towards a target object in contact with a surface, the surface being an ultrasonic sensor surface or a surface of a device proximate an area in which the ultrasonic sensor resides, receiving first ultrasonic receiver signals from the ultrasonic sensor, the first ultrasonic receiver signals including signals corresponding to reflections of the first ultrasonic waves from the target object, obtaining an estimation of a touch location of the target object on the surface based on the first ultrasonic receiver signals received, controlling the ultrasonic sensor system for transmission of second ultrasonic waves towards the target object in contact with the surface, receiving second ultrasonic receiver signals from the ultrasonic sensor, the second ultrasonic receiver signals including signals corresponding to reflections of the second ultrasonic waves from the target object, and obtaining a fingerprint image or fingerprint characteristics of the target object on the surface based on the second ultrasonic receiver signals received, where controlling the ultrasonic sensor system for transmission of the second ultrasonic waves and/or receiving the second ultrasonic receiver signals includes transmitting the second ultrasonic waves and/or receiving the second ultrasonic receiver signals over a partial fraction of the surface, where the control system is configured to select the partial fraction based on the obtained estimate of the touch location. In some instances, the apparatus is integrated into a mobile device having a display and the two-dimensional array of ultrasonic receiving pixels extends substantially entirely across the display.

Other innovative aspects of the subject matter described in this disclosure can be implemented in a device or apparatus including an ultrasonic sensor system and a control system. The ultrasonic sensor system may include a two-dimensional array of ultrasonic receiving pixels, where each of the plurality of ultrasonic receiving pixels is divided into and associated with a plurality of ultrasonically-sensitive subregions that are electrically coupled to a respective common node and each ultrasonically-sensitive subregion is substantially surrounded by ultrasonically-sensitive subregions associated with other ultrasonic receiving pixels such that the ultrasonically-sensitive subregions of different ultrasonic receiving pixels are interleaved together within the array, a plurality of binning switches, each of which is electrically coupled between the common nodes of a respective pair of adjacent ultrasonic receiving pixels, and one or more ultrasonic transmitters. The control system may be configured to (a) drive the one or more ultrasonic transmitters as part of a touch position sensing operation, (b) close a plurality of the binning switches to bin together at least some of the common nodes, (c) obtain receiver signals from at least some of the binned common nodes, (d) determine a touch position based on the obtained receiver signals from the at least some of the binned common nodes, (e) drive the one or more ultrasonic transmitters as part of a fingerprint imaging operation, (f) obtain un-binned receiver signals from at least some of the common nodes, and (g) convert the obtained un-binned receiver signals into a fingerprint image or fingerprint characteristics.

In some implementations, each of the ultrasonic receiving pixels in the two-dimensional array of ultrasonic receiving pixels is divided into and associated with nine (9) ultrasonically-sensitive subregions that are electrically coupled to the common node. According to some examples, the two-dimensional array is part of a larger two-dimensional array of ultrasonic receiving pixels. In some instances, the apparatus is integrated into a mobile device having a display and the larger two-dimensional array of ultrasonic receiving pixels extends substantially entirely across the display.

Other innovative aspects of the subject matter described in this disclosure can be implemented in a device or apparatus including means for capturing a fingerprint image, the means including an array of pixels, each of which is divided into and associated with a plurality of ultrasonically-sensitive subregions that are electrically coupled to a respective common node and where each ultrasonically-sensitive subregion is substantially surrounded by ultrasonically-sensitive subregions associated with other pixels such that the ultrasonically-sensitive subregions of different pixels are interleaved together within the array. In some implementations, the apparatus further includes means for binning together common nodes of multiple adjacent pixels and means for determining touch position coordinates using the binned common nodes.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
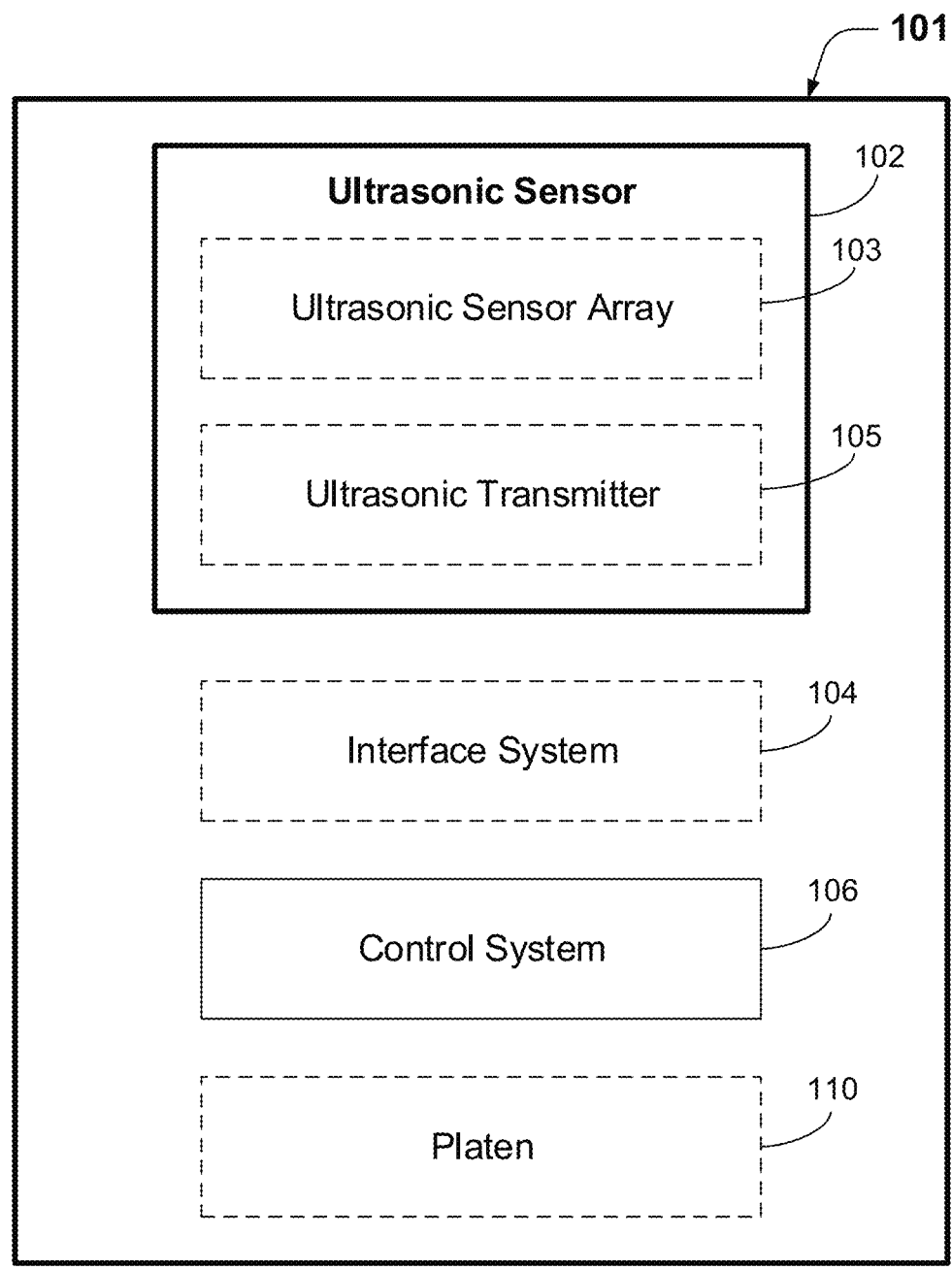
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Capturing a fingerprint with sufficient detail for use in fingerprint-based authentications can be difficult when utilizing an ultrasonic-based sensing system. In particular, an ultrasonic-based sensing system generally requires a high density of sensor pixels, relative to other sensing systems such as capacitive-based sensing systems, to achieve the same resolution in the sensed fingerprint images. As an example, capacitive-based sensing systems may be able to locate positions of fingerprint structures to within approximately 80 micrometers, even when configured with a significantly greater pixel pitch of approximately 4 millimeters. The ability of a capacitive-based sensing system to sense details at a finer detail than the pixel pitch of the system may be possible, in part, because of the natural divergence of the electric field the system senses, which may enable an interpolation for positions that lie between adjacent capacitive sensor pixels. An ultrasonic-based sensing system, unable to take advantage of the natural divergence of the electric field, typically requires a higher density of sensor pixels to achieve the same resolution in the sensed fingerprint images. The typical need for a high density of sensor pixels is particularly problematic in devices with a large fingerprint-sensing area. As an example, a device such as a mobile telephone may have a display with a diagonal measurement roughly in the range of 4-7 inches and it may be desired to provide fingerprint-sensing capabilities across a large portion, or even all, of the display. An ultrasonic-based sensing system cover a relatively large area and featuring a relatively high density of sensor pixels would be undesirably expensive, complex, and power-consuming. For these and other reasons, it would be desirable to have an ultrasonic-based fingerprint sensing system that exhibits a lower pixel density (i.e., pixel pitch), while maintaining sufficient resolution in the sensed fingerprint images.

In some implementations, an apparatus may include an ultrasonic fingerprint sensor that includes interleaved sensor pixels acoustically coupled to a surface. A individual sensor pixel may include multiple distinct regions (also referred to as prongs) that are sensitive to incoming ultrasonic signals. The distinct regions of different sensor pixels may be interleaved together, such that the ultrasonic fingerprint sensor can capture a fingerprint image with a relative high resolution, despite the ultrasonic fingerprint sensor having a relative low pixel density. As an example, each individual ultrasonic sensor pixels can include 9 distinct ultrasonically-sensitive regions and each ultrasonically-sensitive region (except, perhaps, for certain regions along an edge of the ultrasonic fingerprint sensor) can be surrounded, or substantially surrounded, by ultrasonically-sensitive regions that are associated with other pixels. A given ultrasonically-sensitive region associated with a given pixel may be substantially surrounded by ultrasonically-sensitive regions associated with other pixels when all straight lines that (a) lie in the plane of the array and that (b) emanate from a center of that given region pass through at least one ultrasonically-sensitive region associated with a different pixel before passing through an ultrasonically-sensitive region associated with the given pixel. In other words, each ultrasonically-sensitive region of a first pixel may be surrounded by the ultrasonically-sensitive regions of one or more second pixels. According to some examples, the apparatus may be configured for measuring, and/or obtaining an estimation of, a location of a touch by a target object on the surface. The apparatus may be further configured for measuring, and/or obtaining a fingerprint image of the target object. In some embodiments, multiple sensor pixels may be binned together while measuring, and/or obtaining an estimation of, a location of a touch by a target object on the surface, which may have various benefits including, but not limited to, an increased signal-to-noise ratio, a decreased read-out time, and a decreased power consumption.

FIG. 1 is a block diagram that shows example components of an apparatus according to some disclosed implementations. In this example, the apparatus 101 includes an ultrasonic sensor system 102, a control system 106 and a platen 110. Some implementations of the apparatus 101 may include an interface system 104.

In some examples, as suggested by the dashed lines within the ultrasonic sensor system 102, the ultrasonic sensor system 102 may include an ultrasonic sensor array 103 and a separate ultrasonic transmitter 105. In some such examples, the ultrasonic transmitter 105 may include an ultrasonic plane-wave generator, such as those described below.

However, various examples of ultrasonic sensor systems 102 are disclosed herein, some of which may include a separate ultrasonic transmitter 105 and some of which may not. Although shown as separate elements in FIG. 1, in some implementations the ultrasonic sensor array 103 and the ultrasonic transmitter 105 may be combined in an ultrasonic transceiver system. For example, in some implementations, the ultrasonic fingerprint sensor 102 may include a piezoelectric receiver layer, such as a layer of polyvinylidene fluoride (PVDF) polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. The control system 106 may be capable of receiving and processing data from the ultrasonic sensor system 102, e.g., from the ultrasonic sensor array 103. If the apparatus 101 includes a separate ultrasonic transmitter 105, the control system 106 may be capable of controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic sensor system 102. According to some such examples, a portion of the interface system 104 may couple at least a portion of the control system 106 to the ultrasonic sensor system 102, e.g., via electrically conducting material. If the apparatus 101 includes an ultrasonic transmitter 105 that is separate from the ultrasonic sensor array 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a system packet interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2A:
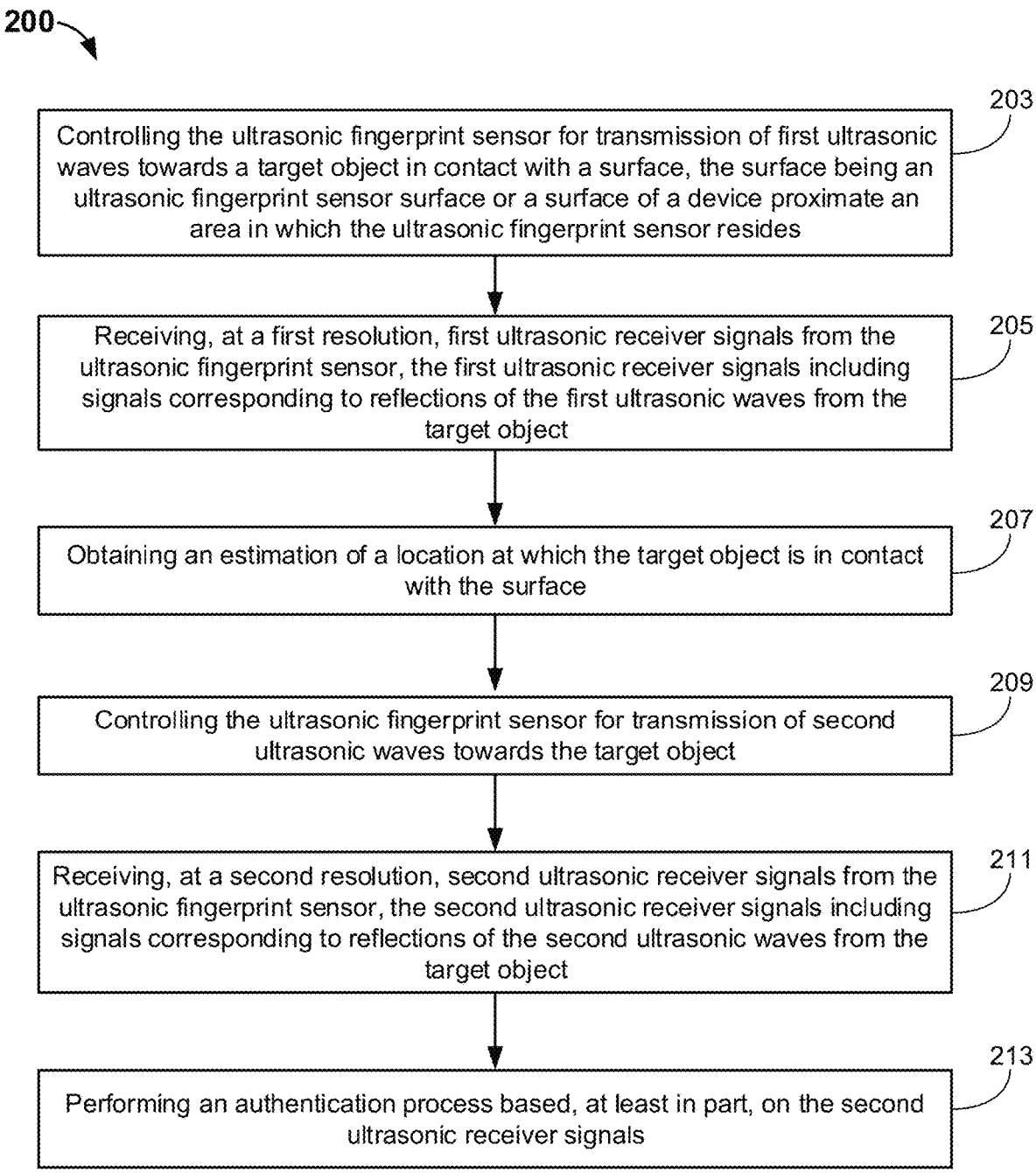
FIG. 2A is a flow diagram that provides example blocks of some methods disclosed herein.

FIG. 2A is a flow diagram that provides example blocks of some methods disclosed herein. The blocks of FIG. 2A may, for example, be performed by the apparatus 101 of FIG. 1 or by a similar apparatus. As with other methods disclosed herein, the method 200 outlined in FIG. 2A may include more or fewer blocks than indicated. Moreover, the blocks of methods disclosed herein are not necessarily performed in the order indicated. In some examples, some blocks of methods disclosed herein may be performed concurrently.

According to this example, the method 200 is a method of controlling an apparatus that includes an ultrasonic sensor that may be configured for sensing touch locations and/or capturing characteristics and/or images of fingerprints. According to this implementation, block 203 involves controlling (e.g., via a control system of the apparatus, such as the control system 106 of the apparatus 101 that is shown in FIG. 1), the ultrasonic fingerprint sensor for transmission of first ultrasonic waves towards a target object in contact with a surface. The surface may be an ultrasonic touch and/or fingerprint sensor surface or a surface of a device proximate an area in which the ultrasonic touch and/or fingerprint sensor resides.

According to some examples, the apparatus may be configured as a touch sensor system and block 203 may involve controlling the ultrasonic fingerprint sensor to transmit ultrasonic waves for the purposes of determining a touch position relative to the surface. In some examples, block 203 may involve controlling the ultrasonic sensor to transmit ultrasonic waves in the range of 1 MHz to 30 MHz. For example, an ultrasonic transmitter of the fingerprint sensor may be controlled for transmission of the first ultrasonic waves.

In this example, block 205 involves receiving first ultrasonic receiver signals from the ultrasonic sensor. The first ultrasonic receiver signals include signals corresponding to reflections of the first ultrasonic waves from the target object. In some embodiments, the first ultrasonic receiver signals received in block 205 may be received at a first resolution. The first resolution may be a resolution that is lower than the highest resolution that the ultrasonic sensor can achieve. In some examples, the first resolution may be a resolution that is optimized for determining touch location on the surface. As a particular example, the first resolution may be fine enough to enable, in block 207, the determination of touch position to with within approximately 4 mm (or another desired level). Using a resolution lower than the highest resolution that the ultrasonic sensor can achieve may provide various benefits including, but not limited to, an increased signal-to-noise ratio, a faster read-out, and lower power consumption. In In some examples, the ultrasonic sensor may be configured to bin multiple pixels together in order to achieve a lowered resolution during touch sensing operations, further details of which are described below.

In this implementation, block 205 involves receiving first ultrasonic receiver signals from the ultrasonic fingerprint sensor. The first ultrasonic receiver signals include signals corresponding to reflections of the first ultrasonic waves from the target object.

According to this implementation, block 207 involves obtaining an estimation of a location at which the target object is in contact with, or in close proximity with, the surface of the apparatus, or a surface of a device that includes the apparatus. In this example, a control system of the apparatus is configured for obtaining the touch location estimation. If desired, the apparatus may include a touch sensor other than the ultrasonic fingerprint sensor and may obtain the estimate of the touch location, in block 207, using such a touch sensor.

In this example, block 209 involves controlling the ultrasonic fingerprint sensor for transmission of second ultrasonic waves towards the target object. According to this implementation, block 211 involves receiving second ultrasonic receiver signals from the ultrasonic fingerprint sensor. Here, the second ultrasonic receiver signals include signals corresponding to reflections of the second ultrasonic waves from the target object. In some implementations, block 209 and/or block 211 may involve controlling the ultrasonic fingerprint sensor for transmission and reception of second ultrasonic waves across a fraction of the surface area of the ultrasonic fingerprint sensor. As an example, the ultrasonic fingerprint sensor may, in block 207, transmit second ultrasonic waves in a region that is approximately fingerprint-sized or larger and where the location of that region is determined, at least in part, by and includes the estimated location of the touch location obtained in block 207. As an alternative or additional example, the ultrasonic fingerprint sensor may, in block 211, receive second ultrasonic waves in a region that is approximately fingerprint-sized or larger and where the location of that region is determined, at least in part, by and includes the estimated location of the touch location obtained in block 207. As examples, blocks 209 and/or 211 involve transmitting and/or receiving ultrasonic signals over a region that is about 0.25 inches, about 0.50 inches, about 0.75 inches, about 1.0 inches, about 1.25 inches, about 1.5 inches, about 1.75 inches, or about 2.0 inches along a first dimension and that is about 0.25 inches, about 0.50 inches, about 0.75 inches, about 1.0 inches, about 1.25 inches, about 1.5 inches, about 1.75 inches, or about 2.0 inches along a second dimension that is perpendicular to the first dimension. Limiting the area over which ultrasonic signals are transmitted and/or received in blocks 209 and/or 211 may beneficially reduce the power consumption and/or processing time of capturing fingerprint images.

According to this example, block 213 involves performing an authentication process based, at least in part, on the second ultrasonic receiver signals received in block 213 and/or the first ultrasonic receiver signals received in block 205. In some instances, block 213 may involve obtaining fingerprint image data corresponding to the signals. As used herein, the term "fingerprint image data" may refer generally to data obtained from, or data based on signals obtained from, an ultrasonic receiver. In some instances, the fingerprint image data may correspond, at least in part, to a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic fingerprint sensor, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area, which may be determined based on the estimated touch location obtained in block 207.

In some examples, block 213 may involve extracting features from the ultrasonic receiver signals. The authentication process may be based, at least in part, on the features. According to some examples, the features may be fingerprint features, such as the locations, orientations and/or types of fingerprint minutiae. In some such examples, the fingerprint image data may include indications of one or more fingerprint features detected in at least a portion of the signals from the sensor system (such as an ultrasonic fingerprint sensor). The fingerprint features may include one or more fingerprint ridge features and one or more fingerprint valley features. The fingerprint features may, for example, be detected by a control system such as the control system 106 of FIG. 1.

Signals indicating fingerprint ridge features may generally be obtained from sensor pixels of the ultrasonic fingerprint sensor that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/ fingerprint valley interface will generally be reflections from a platen/air interface, whereas the reflections from a platen/fingerprint ridge interface will generally be reflections from a platen/skin interface, corresponding to areas in which fingerprint ridges are in contact with a platen. Because a platen/fingerprint valley interface will generally have a much higher acoustic impedance contrast than a platen/fingerprint ridge interface, a platen/fingerprint valley interface will generally produce relatively higher-amplitude reflections.

Figure 2B:
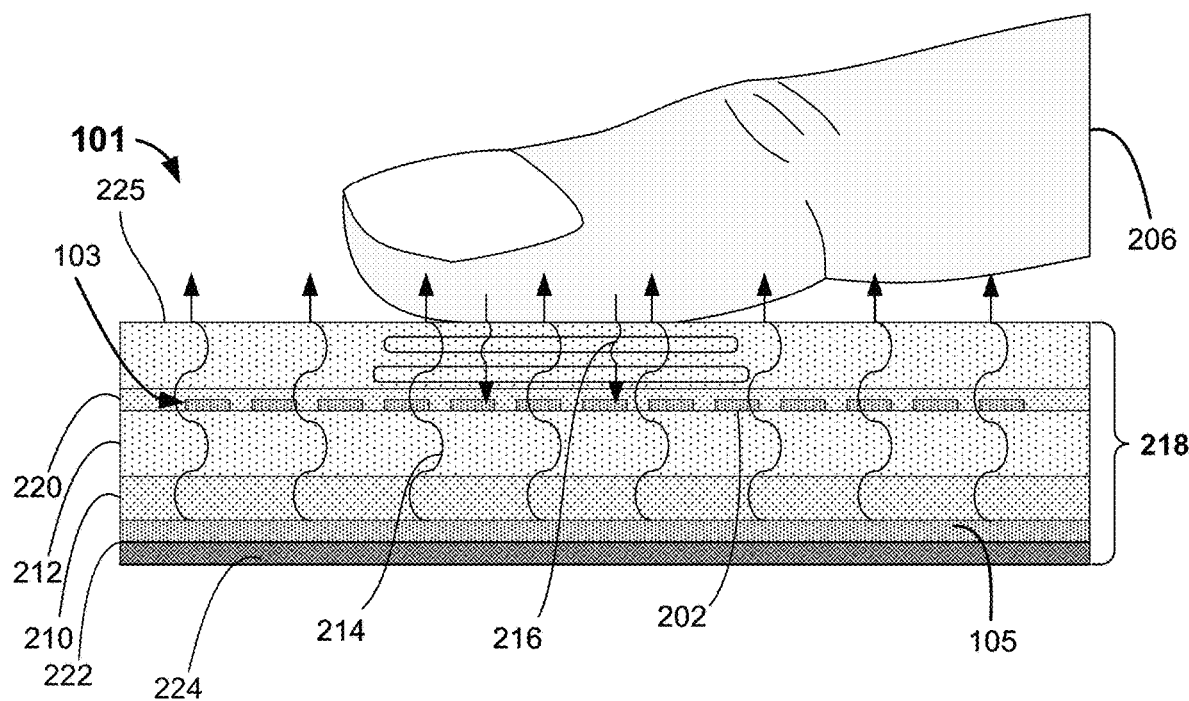
FIG. 2B shows an example of a cross-sectional view of an apparatus capable of performing at least some methods that are described herein.

FIG. 2B shows an example of a cross-sectional view of an apparatus capable of performing at least some methods that are described herein. For example, the apparatus 101 may be capable of performing the methods that are described herein with reference to FIG. 2A. Here, the apparatus 101 is an example of the apparatus 101 that is described above with reference to FIG. 1. As with other implementations shown and described herein, the types of elements, the arrangement of the elements and the dimensions of the elements illustrated in FIG. 2B are merely shown by way of example.

FIG. 2B shows an example of ultrasonic waves reflecting from a target object. In this example, the target object is a finger 206 being insonified by transmitted ultrasonic waves 214. In this example, the transmitted ultrasonic waves 214 are instances of the first ultrasonic waves and second ultrasonic waves that are described above with reference to 203 and 209 of FIG. 2A. Here, the reflected ultrasonic waves 216 that are received by at least a portion of the ultrasonic sensor array 103 are instances of the reflections of the first ultrasonic waves and the second ultrasonic waves from the target object that are described above with reference to 205 and 211 of FIG. 2A.

In this example, the ultrasonic waves are transmitted by an ultrasonic transmitter 105 that is separate from the ultrasonic sensor array 103. In the example shown in FIG. 2B, at least a portion of the apparatus 101 includes an ultrasonic transmitter 105 that may function as a plane-wave ultrasonic transmitter. In some implementations, the ultrasonic transmitter 105 may include a piezoelectric transmitter layer with transmitter excitation electrodes disposed on each side of the piezoelectric transmitter layer. In some examples, the ultrasonic transmitter 105 may be, or may include, a piezoelectric layer, such as a layer of PVDF polymer or a layer of PVDF-TrFE copolymer. In this example, an electrode layer 222 resides between the ultrasonic transmitter 105 and a passivation layer 224. According to some examples, a control system (not shown in FIG. 2B), such as the control system 106 of FIG. 1, may control the ultrasonic transmitter 105 according to electrical signals provided via the electrode layer 222.

In some examples, the ultrasonic sensor array 103 may include an array of pixel input electrodes and sensor pixels formed in part from TFT circuitry, an overlying piezoelectric receiver layer 220 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic sensor arrays are described below.

However, in alternative implementations, the ultrasonic sensor array 103 and the ultrasonic transmitter 105 may be combined in an ultrasonic transceiver array. For example, in some implementations, the ultrasonic sensor 102 may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 214 have been transmitted from the ultrasonic transmitter 105 through a sensor stack 218 and into an overlying finger 206. The various layers of the sensor stack 218 may, in some examples, include one or more substrates of glass or other material (such as plastic or sapphire) that is substantially transparent to visible light. In this example, the sensor stack 218 includes a substrate 210 to which a light source system (not shown) is coupled, which may be a backlight of a display according to some implementations. In alternative implementations, a light source system may be coupled to a front light. Accordingly, in some implementations a light source system may be configured for illuminating a display and the target object. Other implementations may not include the substrate 210.

In this implementation, the substrate 210 is coupled to a thin-film transistor (TFT) substrate 212 for the ultrasonic sensor array 103. According to this example, a piezoelectric receiver layer 220 overlies the sensor pixels 202 of the ultrasonic sensor array 103 and a platen 225 overlies the piezoelectric receiver layer 220. Accordingly, in this example the apparatus 101 is capable of transmitting the ultrasonic waves 214 through one or more substrates of the sensor stack 218 that include the ultrasonic sensor array 103 with the TFT substrate 212 and the platen 225, which may also be viewed as a substrate. In alternative examples, the sensor pixels 202 of the ultrasonic sensor array 103 may reside between the substrate 212 and the ultrasonic transmitter 105.

According to some examples, a force sensor may be integrated into circuitry of the ultrasonic fingerprint sensor. In such examples, some or all of the sensor pixels 202 may be sensitive to force and/or pressure.

In some implementations, sensor pixels 202 may be transparent, partially transparent or substantially transparent, such that the apparatus 101 may be capable of transmitting light from a light source system through elements of the ultrasonic sensor array 103. In some implementations, the ultrasonic sensor array 103 and associated circuitry may be formed on or in a glass, plastic or silicon substrate.

Referring again to FIG. 2A, in some implementations method 200 may involve performing an anti-spoofing process. According to some implementations, method 200 may involve additional processes that depend on the outcome of the authentication process of block 213 and/or the anti-spoofing process, if any. For example, if the authentication process and/or the anti-spoofing process (if any) conclude successfully, a control system may allow access to a device and/or to a secure area. In some such instances, a control system may unlock a mobile device, a laptop computer, a door, an automobile, or another device.

Figure 3A:
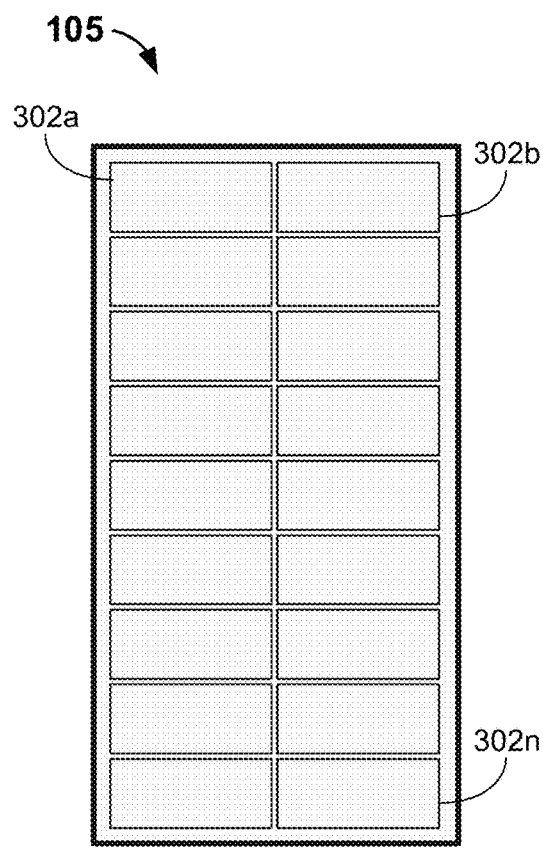
FIGS. 3A, 3B, and 3C show examples of an ultrasonic sensor with segmented transmitter sections, touch nodes, and fingerprint sensor pixels.
Figure 3B:
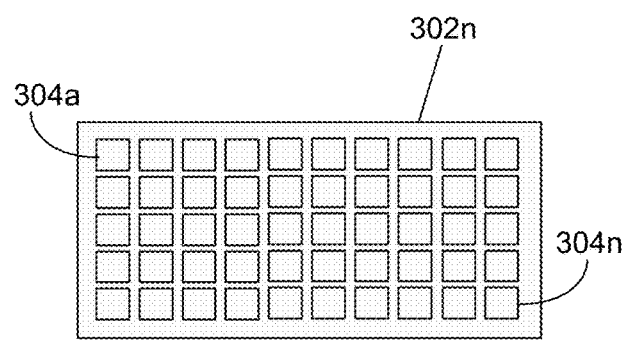
Figure 3C:
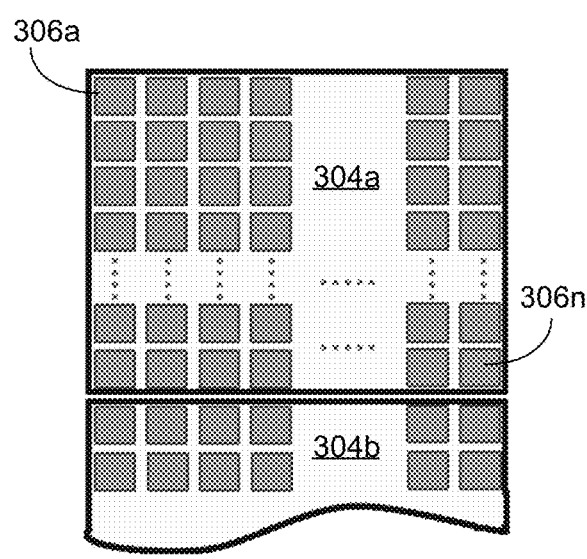

FIGS. 3A, 3B, and 3C representationally depicts aspects of an ultrasonic sensing system (such as the ultrasonic sensor 102 shown in FIG. 1) that may be capable of determining touch locations and/or obtaining fingerprint images.

As shown in FIG. 3A, an ultrasonic transmitter 105 (such as the ultrasonic transmitter 105 shown in FIG. 1) may be broken up into multiple distinct segments 302a, 302b, ..., and 302n. With arrangements of this type, the ultrasonic sensing system can transmit ultrasonic signals across one or more selected segments, while not transmitting ultrasonic signals across one or more unselected segments, which may help to reduce power consumption and which may provide other benefits. As an example, blocks 203 and/or 209 of FIG. 2A may involve transmitting ultrasonic signals from one or more selected segments 302a, 302b, ..., and 302n. Segments may be selected (i.e., utilized in transmitting ultrasonic signals) based on feedback from the ultrasonic sensing system and/or based on feedback from other sources. As a first example, segments may be selected based on the touch location estimation obtained in block 207 of FIG. 2A, where the segment(s) including the estimated touch location are selected and/or one or more segments adjacent to the segment(s) including the estimated touch location. As a second example, segments may be selected based on a touch location estimate obtained via use of a separate touch sensor.

In the example of FIG. 3A, the ultrasonic transmitter 105 is divided into an 9 by 2 array of segments, however this is merely one example. In general, the ultrasonic transmitter 105 may be dived into an array of any desired dimension. While the example of FIG. 3A illustrates the segments as having a common shape and size, the segments of the ultrasonic transmitter 105 may, in general, have differing shapes and/or sizes. If desired, the ultrasonic transmitter 105 may include a single transmitter segment that spans the entirety of the ultrasonic sensing system.

As shown at least in FIG. 3B, the ultrasonic sensing system can include a plurality of touch nodes 304a, ..., and 304n associated with each one of the ultrasonic transmitter segments 302a, 302b, ..., and 302n. Each touch node may be formed from a plurality of ultrasonic sensor pixels. Although only segment 302n is shown in FIG. 3B, it should be understood that other segments within the ultrasonic sensing system may also have corresponding arrays of touch nodes. In some embodiments, each touch node has a physical size that balances the sensitivity requirements of touch sensing with other considerations such as read-out complexity and processing requirements. Smaller touch nodes will generally be able to estimate the location of a touch to within a smaller area, at the expensive of greater read-out complexity and processing requirements and eventually hitting the limits of human perception and dexterity. In some embodiments, touch nodes including touch nodes 304a, ..., and 304n may be about 0.05 inches, about 0.10 inches, about 0.15 inches, about 0.20 inches, or about 0.25 inches along a first dimension and may be about 0.05 inches, about 0.10 inches, about 0.15 inches, about 0.20 inches, or about 0.25 inches along a second dimension that is perpendicular to the first dimension. In general, the physical size of a touch node may be determined by the number of ultrasonic sensor pixels included within the touch node, the size of those ultrasonic sensor pixels, and the spacing between those ultrasonic sensor pixels. Thus, the physical size of a touch node may be adjusted by changing the number of ultrasonic pixels included within the touch node, changing the size of the ultrasonic sensor pixels, changing the spacing between those ultrasonic sensor pixels, or a combination of such techniques.

As shown at least in FIG. 3C, each touch node may be formed from a plurality of ultrasonic sensor pixels 306a, ..., and 306n. In some embodiments, the ultrasonic sensor pixels 306a, ..., 306n in each touch node may be binned together during touch sensing operations, which may improve a signal-to-noise ratio, reduce a read-out complexity, reduce power requirements, and/or provide other such benefits. FIG. 3C specifically illustrates touch node 304a and touch node 304b. In general, any desired number of ultrasonic sensor pixels may be included within each touch node. As examples, each touch node may include an array having 10, 15, 20, 25, 30, 35, 40, 45, or 50 ultrasonic sensor pixels along a first dimension and having 10, 15, 20, 25, 30, 35, 40, 45, or 50 ultrasonic sensor pixels along a second dimension perpendicular to the first dimension. As a specific example, each touch node may include an array of 42 by 42 ultrasonic sensor pixels, which may be binned together during touch sensing operations. The ultrasonic sensor pixels such as pixels 306a, ..., and 306n may, in general, have any desired pitch (i.e., spacing between the centers of adjacent pixels). As examples, the centers of adjacent ultrasonic sensor pixels may be separated by about 20 micrometers, about 30 micrometers, about 40 micrometers, about 50 micrometers, about 60 micrometers, about 70 micrometers, about 80 micrometers, about 90 micrometers, about 100 micrometers, about 110 micrometers, or about 120 micrometers.

As previously discussed, an ultrasonic sensor may include interleaved sensor pixel, which may help to achieve a relatively high resolution in fingerprint images even with a relatively low density of sensor pixels. Examples of an ultrasonic sensor with interleaved sensor pixels are shown in FIGS. 4A and 4B.

Figures 4A, 4B:
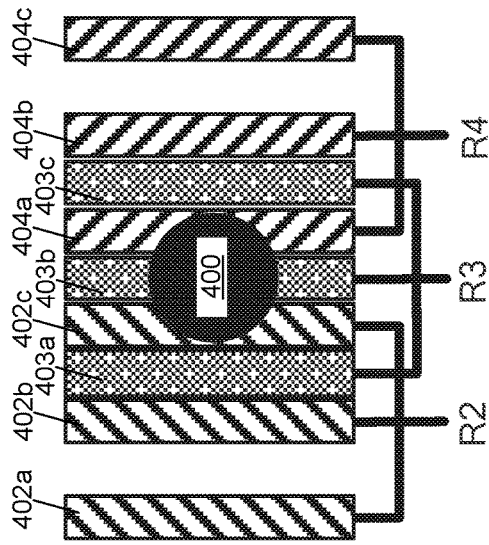
FIGS. 4A and 4B show examples of an ultrasonic sensor with interleaved sensor pixels.

As shown in FIGS. 4A and 4B, the sensor pixels of the ultrasonic sensors disclosed herein, such as the sensor pixels of the ultrasonic sensor array 103 of FIG. 1, may have ultrasonically-sensitive regions that are interleaved with the ultrasonically-sensitive regions of other sensor pixels. FIG. 4A illustrates an example of interleaved sensor pixels in a single dimension, while FIG. 4B illustrates an example of interleaved sensor pixels in a two dimensional array.

FIG. 4A illustrates three sensor pixels R2, R3, and R4 (which may represent rows 2, 3, and 4) each of which has three prongs. As shown in FIG. 4A, the three prongs 403a, 403b, and 403c of sensor pixel R3 are separated by prong 402c of sensor pixel R2 and by prong 404a of sensor pixel R4. With arrangements of this type, the ultrasonic sensor array may be able to detect relatively small movements of a target object 400, despite having a relatively large pixel pitch (e.g., the distance between the averaged centers of each sensor pixel). In particular, a relatively small movement of the target object 400 towards sensor pixel R2 will result in the target object 400 extending over more area associated with sensor pixel R2 and extending over less area associated with sensor pixel R4. The ultrasonic sensor array may be able to measure shifts smaller than the pitch between sensor pixels at least in part by interpolation of signals from adjacent and interleaved sensor pixels. Thus, the changes in the overlap of the sensor pixel prongs of the target object 400 after a relatively small movement can be detected in changes in the ultrasonic signals detected by sensor pixels R2, R3, and R4, in the example of FIG. 4A.

FIG. 4B is a table that illustrates interleaved sensor pixels in a two-dimensional array. In the table of FIG. 4B, each row is labeled R1-R5 and each column is labeled C1-C5. Each individual space represents a sensor pixel prong, which may also be referred to as an ultrasonically-sensitive region. The sensor pixel prongs may be formed from a piezoelectric sensor material such as the PSM of FIG. 5. Each space is associated with a specific sensor pixel and is labeled, in the table of FIG. 4B, with the row and column number of its associated sensor pixel. The ultrasonically-sensitive regions of sensor pixels R2C2 are shown in grey background, while the ultrasonically-sensitive regions of sensor pixels R2C3 are shown in black background with white text. As shown in FIG. 4B, the ultrasonically-sensitive regions of each sensor pixel of the two-dimensional array is generally surrounded by ultrasonically-sensitive regions of other sensor pixels. It is noted that sensor pixels near or on the border of the array may have some ultrasonically-sensitive regions that are not interleaved with the ultrasonically-sensitive regions of other sensor pixels. However, the sensor pixels separated from the edge by at least one sensor pixel may have fully-interleaved ultrasonically-sensitive regions.

While FIG. 4A illustrates sensor pixels having three (3) prongs or distinct ultrasonically-sensitive regions and FIG. 4B illustrates sensor pixels having nine (9) prongs or distinct ultrasonically-sensitive regions, this is merely one possible arrangement. In general, the sensor pixels disclosed herein may include any desired number of prongs. Additionally, while FIGS. 4A and 4B illustrate ultrasonically-sensitive regions having a common size, shape, orientation, and position, this is merely one possible arrangement. If desired, the ultrasonically-sensitive regions may be provided in a variety of sizes, shapes, orientations, and positions. Additionally, the sizes, shapes, orientations, and/or positions of the ultrasonically-sensitive regions may vary between different sensor pixels or between different portions of the array.

Figure 5:
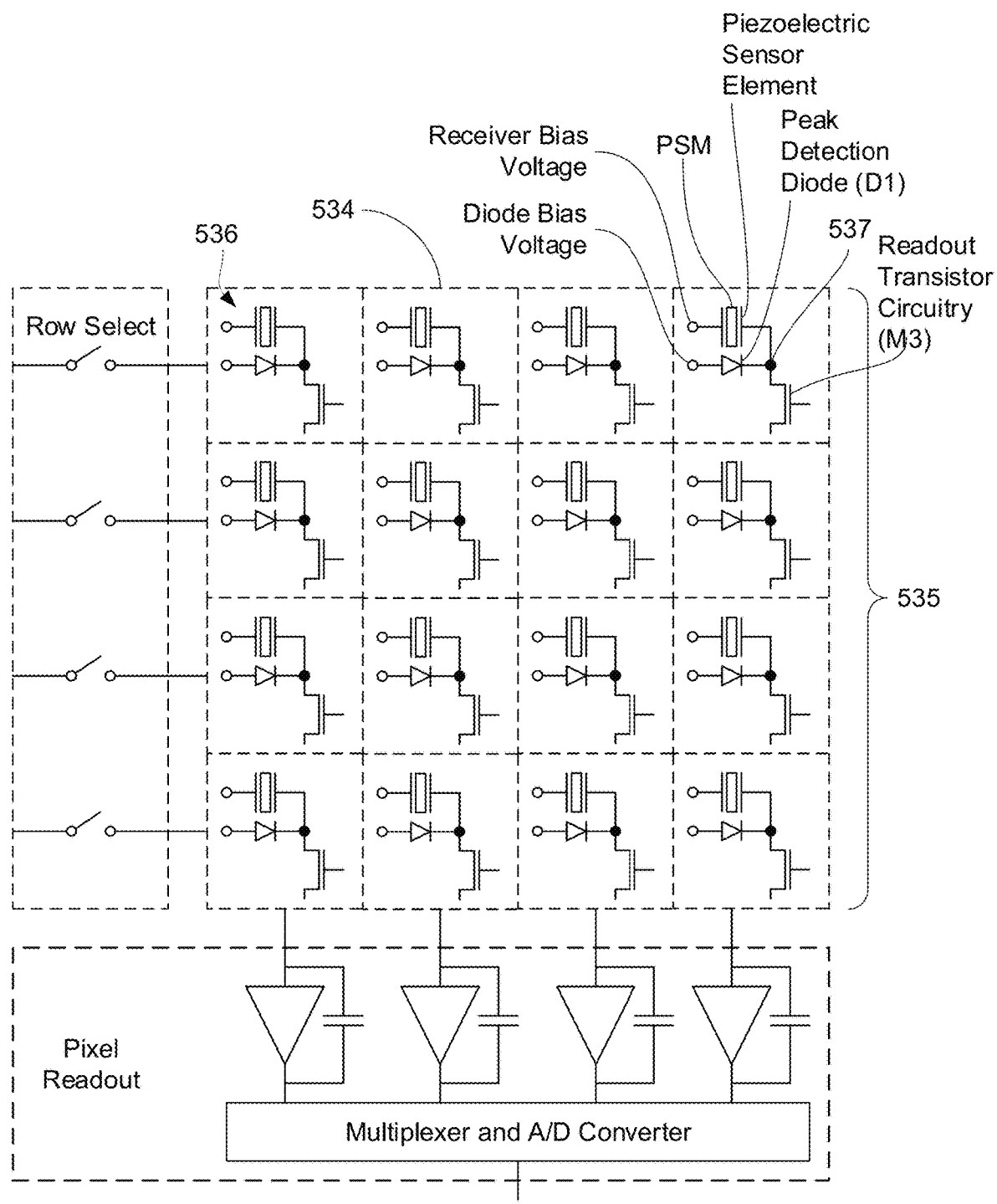
FIG. 5 representationally depicts aspects of a 4×4 pixel array of sensor pixels for an ultrasonic fingerprint sensor.

FIG. 5 representationally depicts aspects of a 4×4 pixel array of sensor pixels for an ultrasonic fingerprint sensor. Each sensor pixel 534 may be, for example, associated with a local region of piezoelectric sensor material (PSM) (or a plurality of PSM regions, as discussed in connection with FIGS. 4A and 4B), a pixel input electrode 537, a peak detection diode (D1) and a readout transistor circuitry (M3); many or all of these elements may be formed on or in a substrate to form the pixel circuit 536. In practice, the local region of piezoelectric sensor material of each sensor pixel 534 may transduce received ultrasonic energy into electrical charges. The peak detection diode D1 may register the maximum amount of charge detected by the local region of piezoelectric sensor material PSM. Each row of the pixel array 535 may then be scanned, e.g., through a row select mechanism, a gate driver, or a shift register, and the readout transistor circuitry M3 for each column may be triggered to allow the magnitude of the peak charge for each sensor pixel 534 to be read by additional circuitry, e.g., a multiplexer and an A/D converter. The pixel circuit 536 may include one or more TFTs to allow gating, addressing, and resetting of the sensor pixel 534 and/or to allow binning of a sensor pixel 534 with one or more other nearby sensor pixels 534. As discussed herein, binning of sensor pixels 534 may be used to reduce the number of discrete signals that need to be read out from the pixel array 535, when less than the maximum resolution of the pixel array 535 is needed. As an example, groups of sensor pixels 534 may be binned together during touch sensor operations, when the pixel array 535 is used only to determine the relatively coarse location of a touch, and may be read-out individually (i.e., not binned together) during fingerprint imaging operations, when the pixel array 535 is used to measure fingerprint characteristics at a significantly finer resolution. Pixels 534 may be binned into groups of any desired size, and any desired shape. As just one example, pixels 534 may be binned into groups of 42 by 42 pixels during touch sensor operations. As additional examples, pixels 534 may be binned into groups of 2 by 2, 4 by 4, 8 by 8, 10 by 10, 15 by 15, 20 by 20, 30 by 30, 40 by 40, or 50 by 50. In some aspects, a group of pixels 534 may be binned together by enabling read-out transistors of each of the pixels in a group such that charges from each of the pixels that are in a common column of a binned group are summed together. Additionally, the array may include pixel read-out circuitry that sums together the charges from a binned group of pixels that spans multiple columns of the array (e.g., that sums charges from multiple columns).

Each pixel circuit 536 may provide information about a small portion of the object detected by the ultrasonic fingerprint sensor. While, for convenience of illustration, the example shown in FIG. 5 is of a relatively coarse resolution, ultrasonic sensors having a resolution on the order of 500 pixels per inch or higher may be configured with an appropriately scaled structure. The detection area of the ultrasonic fingerprint sensor may be selected depending on the intended object of detection. For example, the detection area may range from about 8 mm×3 mm, 5 mm×5 mm or 9 mm×4 mm for a single finger to about 3 inches×3 inches for four fingers. In some aspects, the ultrasonic fingerprint sensor is associated with a display and features a detection area that extends across most or all of the display. Smaller and larger areas, including square, rectangular and non-rectangular geometries, may be used as appropriate for the target object.

Figure 6A:
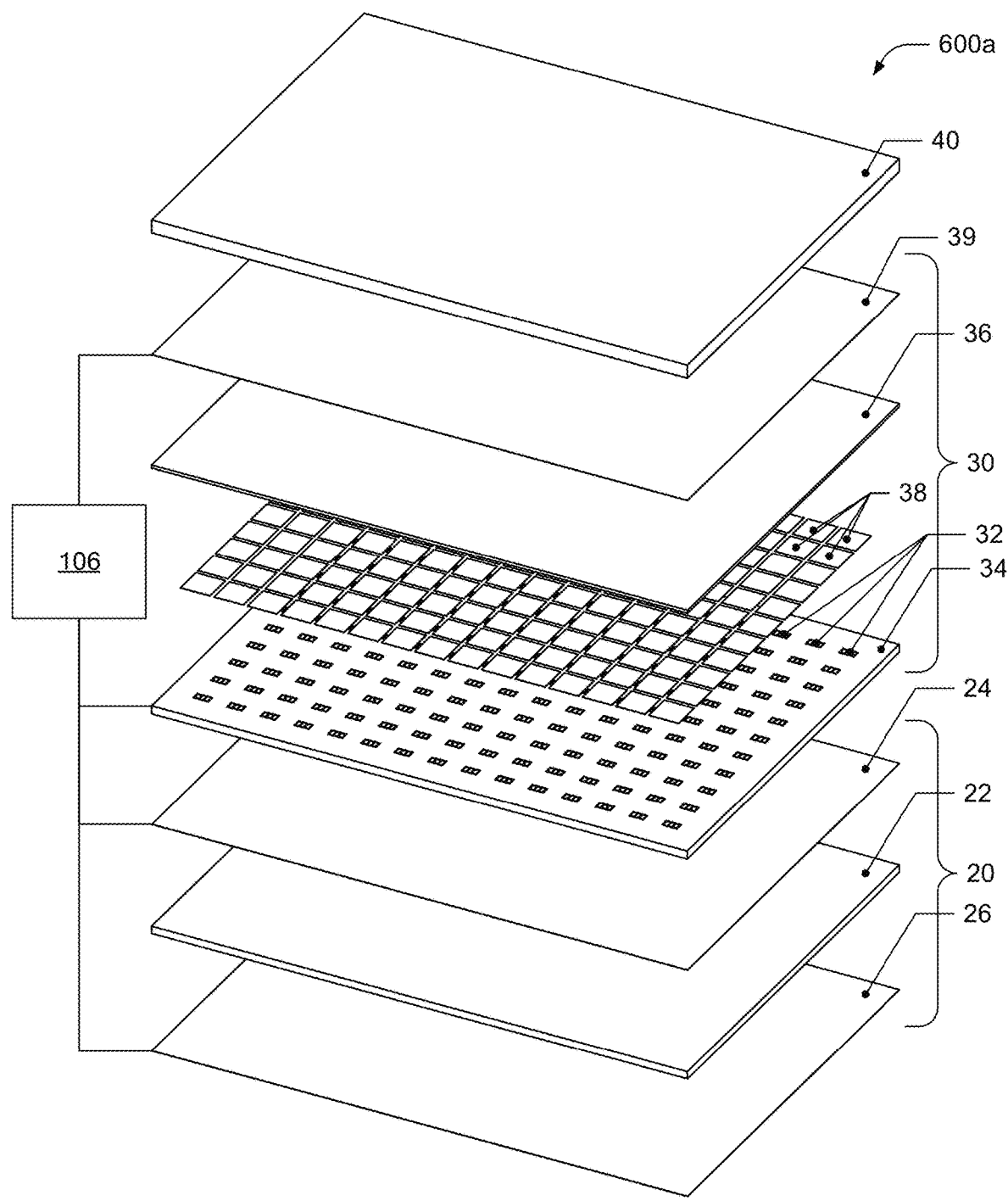
FIGS. 6A and 6B show example arrangements of ultrasonic transmitters and receivers in an ultrasonic fingerprint sensor, with other arrangements being possible.

FIG. 6A shows an example of an exploded view of an ultrasonic fingerprint sensor. In this example, the ultrasonic fingerprint sensor 600a includes an ultrasonic transmitter 20 and an ultrasonic receiver 30 under a platen 40. According to some implementations, the ultrasonic receiver 30 may be an example of the ultrasonic sensor array 103 that is shown in FIG. 1 and described above. In some implementations, the ultrasonic transmitter 20 may be an example of the ultrasonic transmitter 105 that is shown in FIG. 1 and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32. While not illustrated in FIG. 6A, it should be understood that the ultrasonic receiver 30 of FIG. 6A may feature sensor pixels with interleaved ultrasonically-sensitive regions, as discussed at least in connection with FIGS. 4A and 4B.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic fingerprint sensor 600a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic fingerprint sensor 600a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 6B:
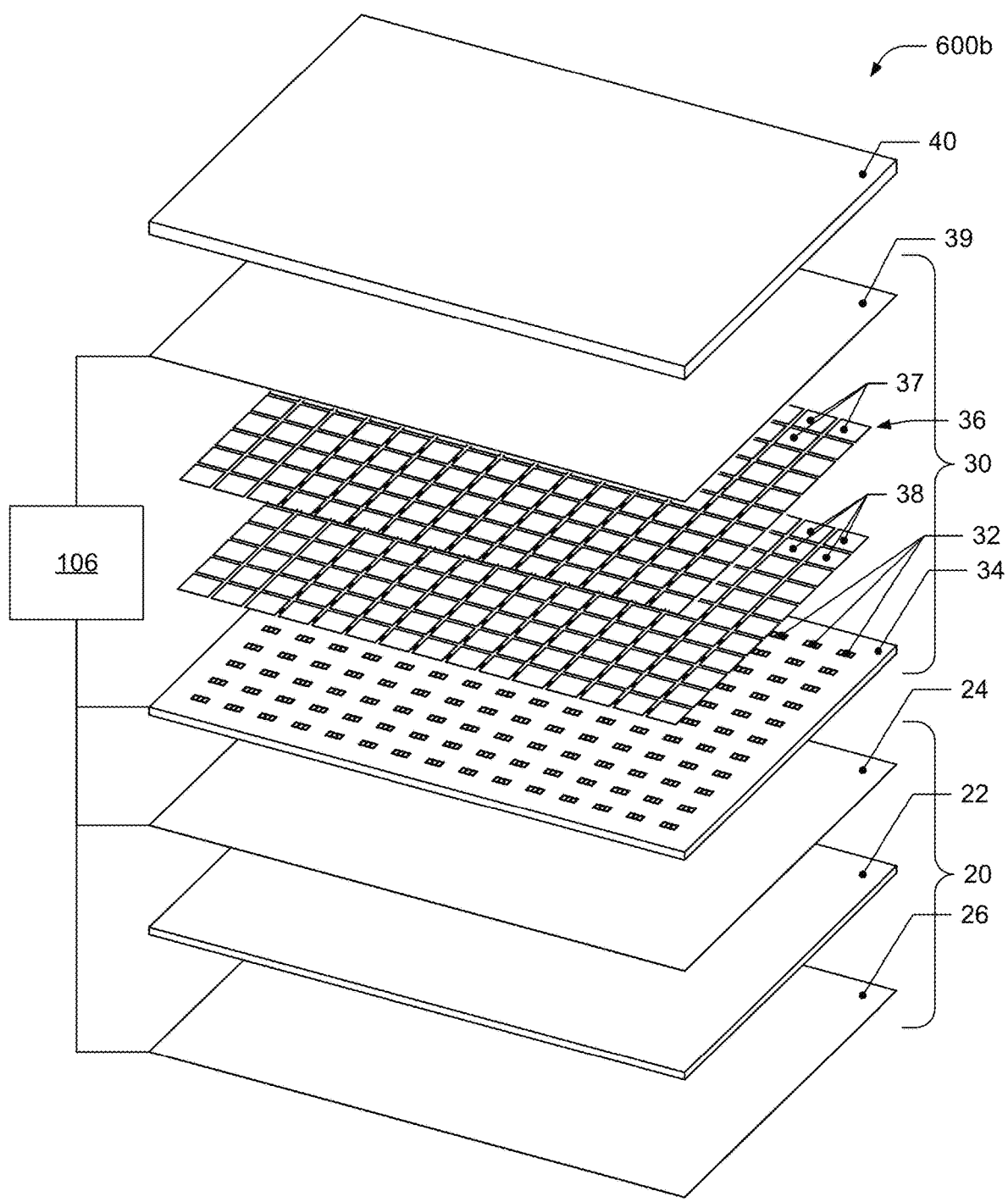

FIG. 6B shows an exploded view of an alternative example of an ultrasonic fingerprint sensor. In this example, the piezoelectric receiver layer 36 has been formed into discrete elements 37. In the implementation shown in FIG. 6B, each of the discrete elements 37 corresponds with a single pixel input electrode 38 and a single sensor pixel circuit 32. However, in alternative implementations of the ultrasonic fingerprint sensor 600b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37. While not illustrated in FIG. 6B, it should be understood that the ultrasonic receiver 30 of FIG. 6B may feature sensor pixels with interleaved ultrasonically-sensitive regions, as discussed at least in connection with FIGS. 4A and 4B. As an example, each of the discrete elements 47 may correspond to a different ultrasonically-sensitive region within the sensor array.

FIGS. 6A and 6B show example arrangements of ultrasonic transmitters and receivers in an ultrasonic fingerprint sensor, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic fingerprint sensor may include an acoustic delay layer. For example, an acoustic delay layer may be incorporated into the ultrasonic fingerprint sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic fingerprint sensor is arriving at the ultrasonic receiver 30. In some implementations, the substrate 34 and/or the platen 40 may serve as an acoustic delay layer.

Figure 6C:
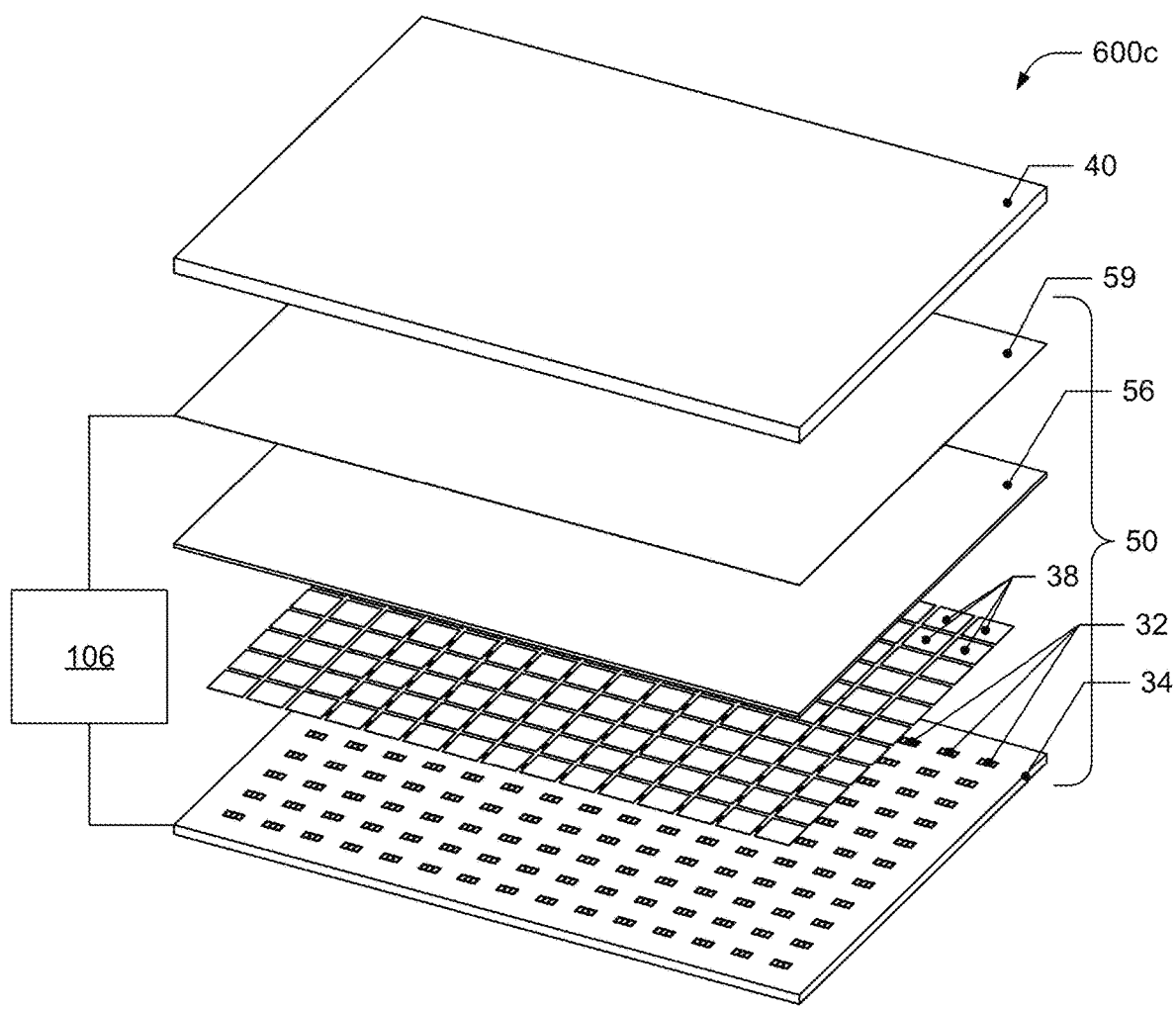
FIG. 6C shows an example of an ultrasonic transceiver array in an ultrasonic fingerprint sensor.

FIG. 6C shows an exploded view of an example of an ultrasonic fingerprint sensor. In this example, the ultrasonic fingerprint sensor 600c includes an ultrasonic transceiver array 50 under a platen 40. According to some implementations, the ultrasonic transceiver array 50 may serve as both the ultrasonic sensor array 103 and the ultrasonic transmitter 105 that is shown in FIG. 1 and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50. While not illustrated in FIG. 6C, it should be understood that the ultrasonic transceiver array 50 may feature pixels with interleaved ultrasonically-sensitive regions, as discussed at least in connection with FIGS. 4A and 4B.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as that described herein, e.g., such as described herein.

In other examples of an ultrasonic fingerprint sensor with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
    an ultrasonic fingerprint sensor system, comprising:
        a two-dimensional array of ultrasonic receiving pixels, wherein:
            each of a plurality of the ultrasonic receiving pixels is divided into and associated with a plurality of ultrasonically-sensitive subregions that are electrically coupled to a common node, and
            each of the plurality of the ultrasonically-sensitive subregions is substantially surrounded by ultrasonically-sensitive subregions associated with other ultrasonic receiving pixels such that the ultrasonically-sensitive subregions of different ultrasonic receiving pixels are interleaved together within the array; and
        an ultrasonic transmitter; and
    a control system configured for:
        controlling the ultrasonic transmitter for transmission of first ultrasonic waves towards a target object in contact with a surface, the surface being an ultrasonic fingerprint sensor surface or a surface of a device proximate an area in which the ultrasonic fingerprint sensor resides;
        receiving first ultrasonic receiver signals from the ultrasonic fingerprint sensor system, the first ultrasonic receiver signals including signals corresponding to reflections of the first ultrasonic waves from the target object;
        obtaining an estimation of a touch location of the target object on the surface based on the first ultrasonic receiver signals;
        controlling the ultrasonic transmitter for transmission of second ultrasonic waves towards the target object in contact with the surface;
        receiving second ultrasonic receiver signals from the ultrasonic fingerprint sensor, the second ultrasonic receiver signals including signals corresponding to reflections of the second ultrasonic waves from the target object; and
        obtaining a fingerprint image or fingerprint characteristics of the target object on the surface based on the second ultrasonic receiver signals, wherein controlling the ultrasonic transmitter for transmission of the second ultrasonic waves and/or receiving the second ultrasonic receiver signals comprises transmitting the second ultrasonic waves to and/or receiving the second ultrasonic receiver signals from a partial fraction of the surface and wherein the control system is configured to select the partial fraction based on the obtained estimate of the touch location.

2. The apparatus of claim 1, wherein each of the plurality of the ultrasonic receiving pixel is divided into and associated with nine (9) ultrasonically-sensitive subregions that are electrically coupled to the common node.

3. The apparatus of claim 1, wherein the two-dimensional array is part of a larger two-dimensional array of ultrasonic receiving pixels.

4. The apparatus of claim 3, wherein the apparatus is integrated into a mobile device having a display and wherein the larger two-dimensional array of ultrasonic receiving pixels extends substantially entirely across the display.

5. The apparatus of claim 1 further comprising a control system, wherein the ultrasonic fingerprint sensor system further comprises one or more ultrasonic transmitters and wherein the control system is configured to (a) drive the ultrasonic transmitters as part of a fingerprint sensing operation, configured to (b) obtain receiver signals from the common nodes of at least some of the ultrasonic receiving pixels, and configured to (c) convert the obtained receiver signals into fingerprint characteristics.

6. The apparatus of claim 5, wherein the ultrasonic fingerprint sensor system further comprises a plurality of binning switches, wherein each of the binning switches is electrically coupled between the common nodes of a respective pair of adjacent ultrasonic receiving pixels, and wherein the control system is further configured to (d) drive the ultrasonic transmitters as part of a touch position sensing operation, configured to (e) close a plurality of the binning switches to bin together at least some of the common nodes, configured to (f) obtain receiver signals from the binned common nodes, and configured to (g) convert the obtained receiver signals from the binned common nodes into at least one pair of touch position coordinates.

7. The apparatus of claim 1 further comprising a control system, wherein the ultrasonic fingerprint sensor system further comprises one or more ultrasonic transmitters and wherein the control system is configured to (a) drive the ultrasonic transmitters as part of a fingerprint sensing operation, configured to (b) obtain receiver signals from the common nodes of at least some of the ultrasonic receiving pixels, and configured to (c) convert the obtained receiver signals into at least one pair of touch position coordinates.

8. The apparatus of claim 1, wherein the ultrasonic transmitter includes multiple ultrasonic transmitter segments.

9. An apparatus, comprising:
an ultrasonic fingerprint sensor system, comprising:
  a two-dimensional array of ultrasonic receiving pixels, wherein:
    the array has edges,
    the array is divided into a first fraction of ultrasonic receiving pixels disposed along one or more of the edges of the array and a second fraction of ultrasonic receiving pixels separated from the edges by at least one ultrasonic receiving pixel of the first fraction,
    each of the ultrasonic receiving pixels in the second fraction is divided into a plurality of ultrasonically-sensitive subregions that are electrically coupled to a common node, and
    each of the ultrasonically-sensitive subregions is substantially surrounded by ultrasonically-sensitive subregions associated with other ultrasonic receiving pixels such that the ultrasonically-sensitive subregions of different ultrasonic receiving pixels in the second fraction are interleaved together within the array; and
  one or more ultrasonic transmitters; and
  a control system configured to:
    (a) drive the one or more ultrasonic transmitters as part of a fingerprint sensing operation;
    (b) obtain receiver signals from the common nodes of at least some of the ultrasonic receiving pixels; and
    (c) convert the obtained receiver signals into fingerprint characteristics.

10. The apparatus of claim 9, wherein each of the ultrasonic receiving pixels in the second fraction is divided into and associated with nine (9) ultrasonically-sensitive subregions that are electrically coupled to the common node.

11. The apparatus of claim 9, wherein the ultrasonic fingerprint sensor system further comprises a plurality of binning switches, wherein each of the binning switches is electrically coupled between the common nodes of a respective pair of adjacent ultrasonic receiving pixels, and wherein the control system is further configured to (d) drive the one or more ultrasonic transmitters as part of a touch position sensing operation, configured to (e) close a plurality of the binning switches to bin together at least some of the common nodes, configured to (f) obtain receiver signals from the binned common nodes, and configured to (g) convert the obtained receiver signals from the binned common nodes into at least one pair of touch position coordinates.

12. The apparatus of claim 9, wherein the control system is configured to convert the obtained receiver signals into at least one pair of touch position coordinates.

13. The apparatus of claim 9, wherein the control system is further configured for:
controlling the ultrasonic fingerprint sensor system for transmission of first ultrasonic waves towards a target object in contact with a surface, the surface being an ultrasonic sensor surface or a surface of a device proximate an area in which the ultrasonic sensor resides;
receiving first ultrasonic receiver signals from the ultrasonic sensor, the first ultrasonic receiver signals including signals corresponding to reflections of the first ultrasonic waves from the target object;
obtaining an estimation of a touch location of the target object on the surface based on the first ultrasonic receiver signals received;
controlling the ultrasonic fingerprint sensor system for transmission of second ultrasonic waves towards the target object in contact with the surface;
receiving second ultrasonic receiver signals from the ultrasonic sensor, the second ultrasonic receiver signals including signals corresponding to reflections of the second ultrasonic waves from the target object; and
obtaining a fingerprint image or fingerprint characteristics of the target object on the surface based on the second ultrasonic receiver signals received, wherein controlling the ultrasonic fingerprint sensor system for transmission of the second ultrasonic waves and/or receiving the second ultrasonic receiver signals comprises transmitting the second ultrasonic waves to and/or receiving the second ultrasonic receiver signals from a partial fraction of the surface, wherein the control system is configured to select the partial fraction based on the obtained estimate of the touch location.

14. The apparatus of claim 9, wherein the apparatus is integrated into a mobile device having a display and wherein the two-dimensional array of ultrasonic receiving pixels extends substantially entirely across the display.

15. An apparatus, comprising:
an ultrasonic fingerprint sensor system, comprising:
  a two-dimensional array of ultrasonic receiving pixels, wherein:

each of the plurality of ultrasonic receiving pixels is divided into and associated with a plurality of ultrasonically-sensitive subregions that are electrically coupled to a respective common node and wherein each ultrasonically-sensitive subregion is substantially surrounded by ultrasonically-sensitive subregions associated with other ultrasonic receiving pixels such that the ultrasonically-sensitive subregions of different ultrasonic receiving pixels are interleaved together within the array;
  a plurality of binning switches, each of which is electrically coupled between the common nodes of a respective pair of adjacent ultrasonic receiving pixels; and
  one or more ultrasonic transmitters; and
a control system configured to:
  (a) drive the one or more ultrasonic transmitters as part of a touch position sensing operation,
  (b) close a plurality of the binning switches to bin together at least some of the common nodes,
  (c) obtain receiver signals from at least some of the binned common nodes,
  (d) determine a touch position based on the obtained receiver signals from the at least some of the binned common nodes,
  (e) drive the one or more ultrasonic transmitters as part of a fingerprint imaging operation,
  (f) obtain un-binned receiver signals from at least some of the common nodes, and
  (g) convert the obtained un-binned receiver signals into a fingerprint image or fingerprint characteristics.

16. The apparatus of claim 15, wherein each of the ultrasonic receiving pixels in the two-dimensional array of ultrasonic receiving pixels is divided into and associated with nine (9) ultrasonically-sensitive subregions that are electrically coupled to the common node.

17. The apparatus of claim 15, wherein the two-dimensional array is part of a larger two-dimensional array of ultrasonic receiving pixels.

18. The apparatus of claim 17, wherein the apparatus is integrated into a mobile device having a display and wherein the larger two-dimensional array of ultrasonic receiving pixels extends substantially entirely across the display.

* * * * *